May 2, 1933.   F. FLEXON   1,906,561
MACHINE FOR FORMING GLASS STOPPERS
Filed July 19, 1930   3 Sheets-Sheet 1
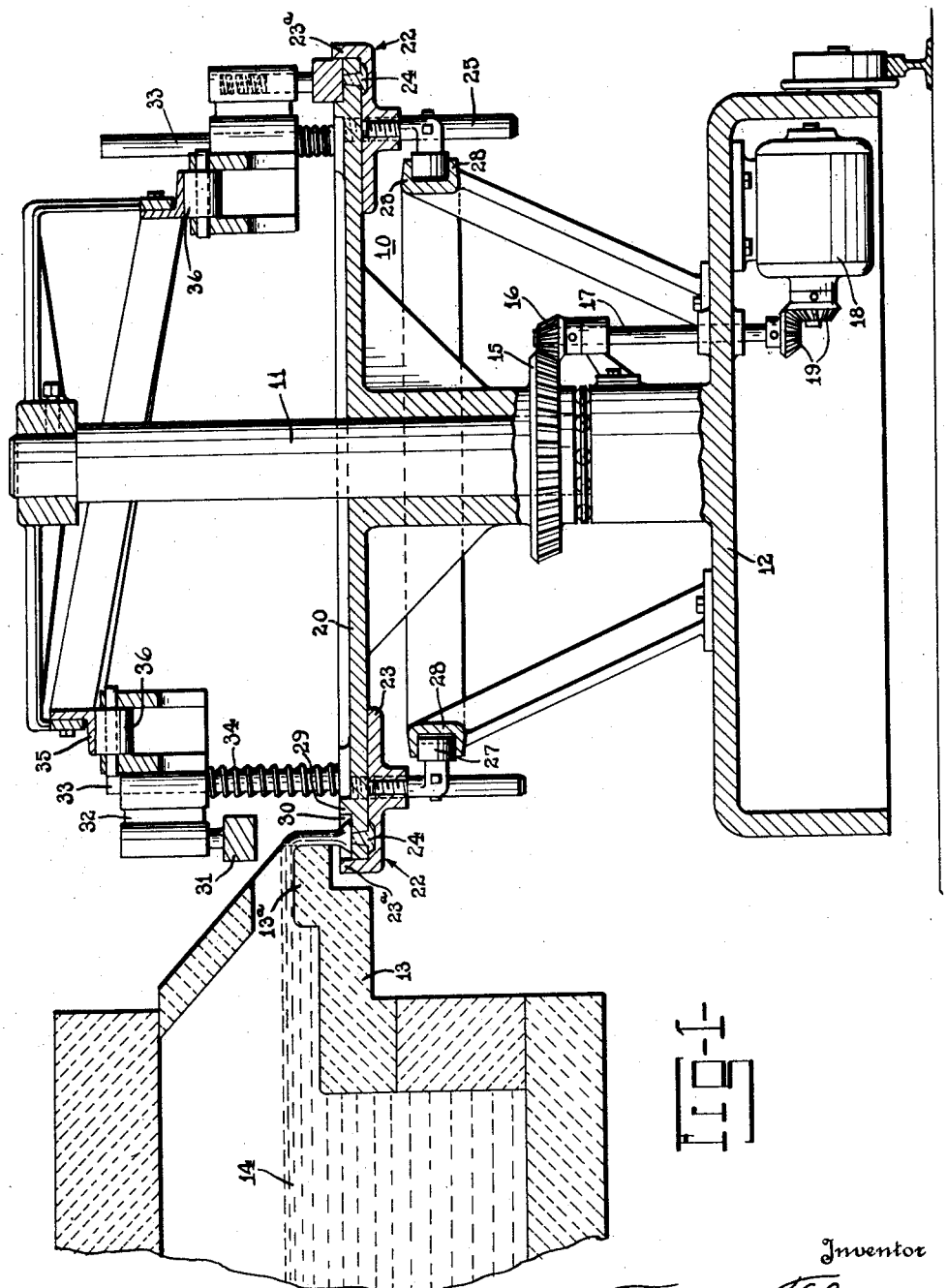
Inventor
Floyd Flexon
By
J. F. Rule
Attorney May 2, 1933. F. FLEXON 1,906,561
MACHINE FOR FORMING GLASS STOPPERS
Filed July 19, 1930 3 Sheets-Sheet 2
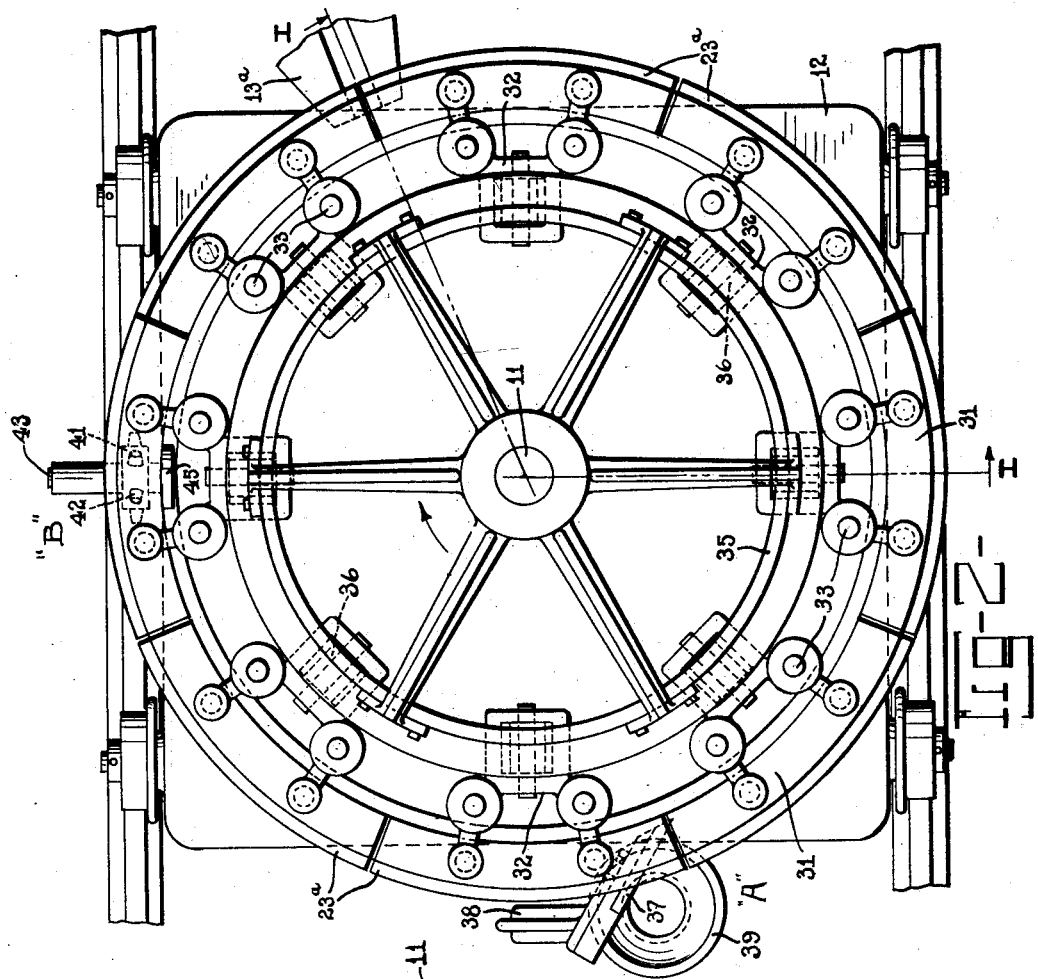
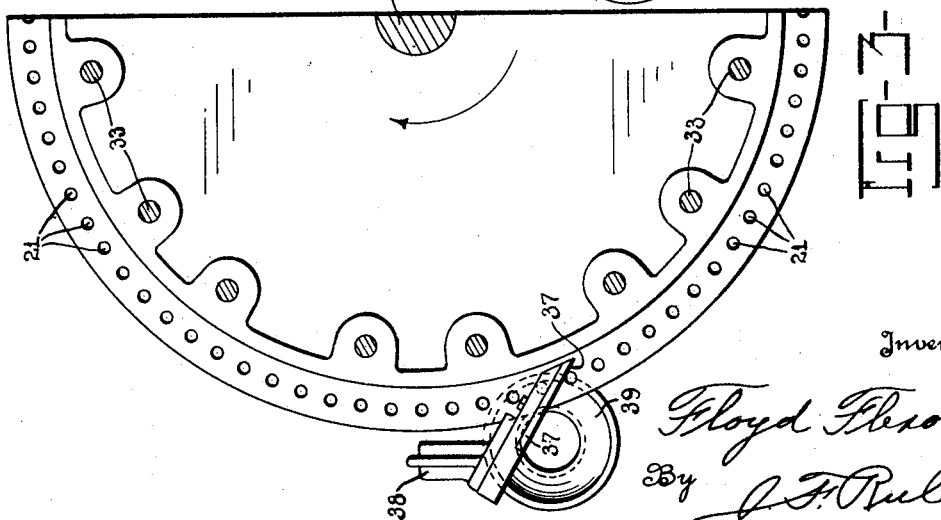
Inventor
Floyd Flexon
By J. F. Rule
Attorney May 2, 1933.   F. FLEXON   1,906,561
MACHINE FOR FORMING GLASS STOPPERS
Filed July 19, 1930   3 Sheets-Sheet 3
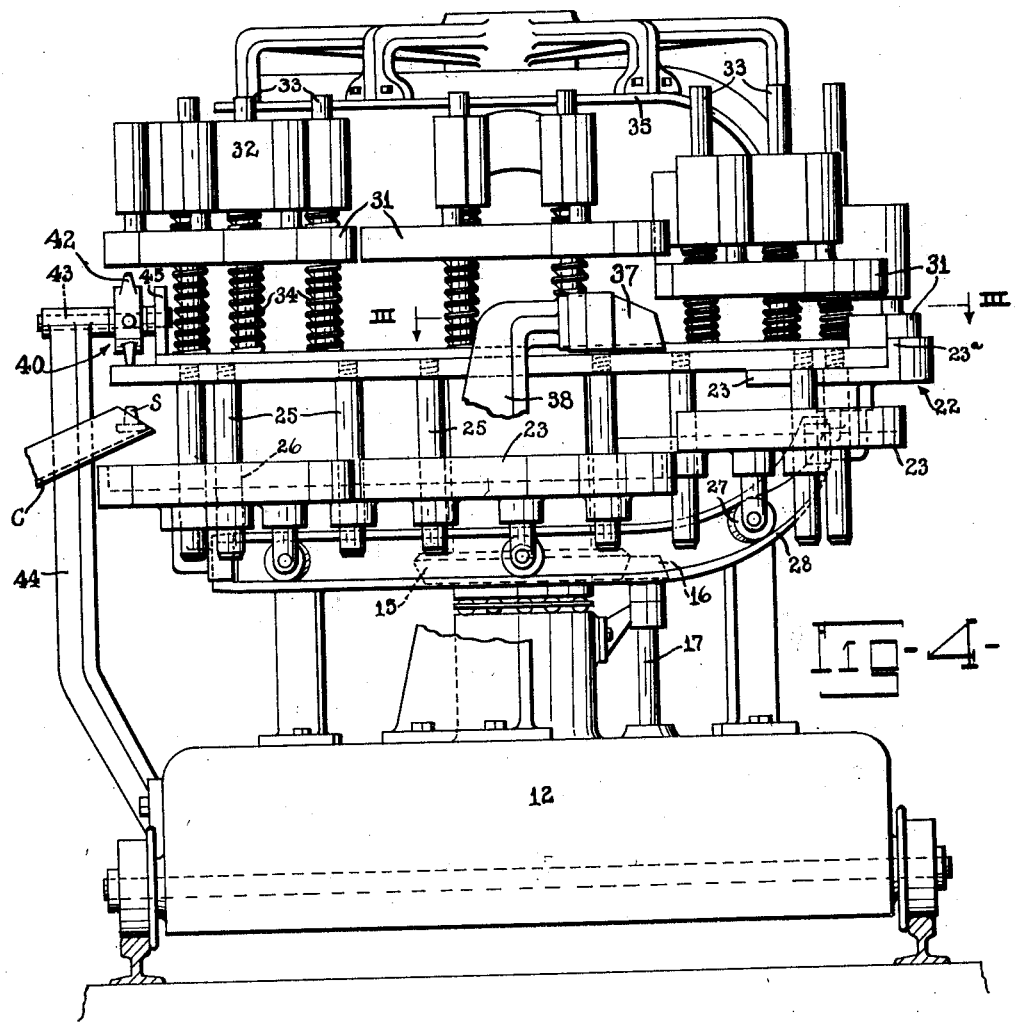
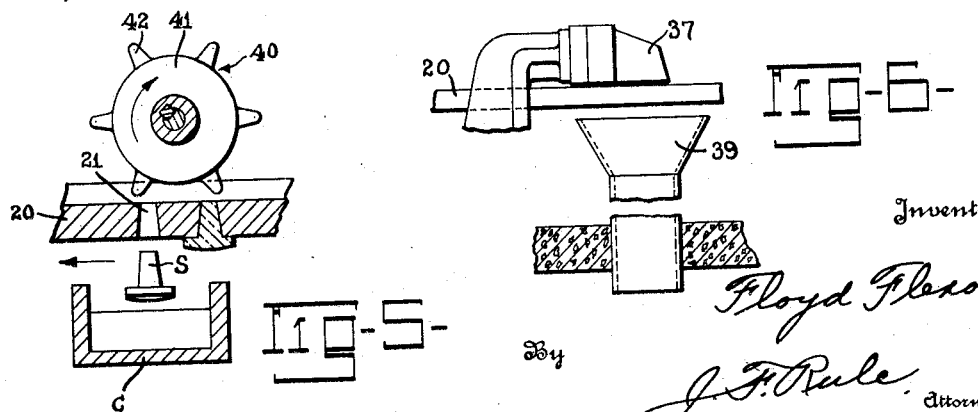
Inventor
Floyd Flexon
By
J. F. Rule, Attorney Patented May 2, 1933

1,906,561

UNITED STATES PATENT OFFICE

FLOYD FLEXON, OF TOLEDO, OHIO, ASSIGNOR TO OWENS-ILLINOIS GLASS COMPANY, A CORPORATION OF OHIO

MACHINE FOR FORMING GLASS STOPPERS

Application filed July 19, 1930. Serial No. 469,057.

The present invention relates to improvements in machines for forming glass stoppers and has for an object the provision of an automatic machine by which high speed production and accurate formation may be obtained.

Another object is the provision in a machine of the above character, of means whereby molten glass may be fed in a continuous stream to the mold cavities in which the stoppers are shaped thereby materially contributing to high speed production. To this end the stopper molds are arranged in a circular path and rotated continuously in a manner to bring the molds in succession to a charging station where molten glass is constantly flowing from a supply body in a stream or ribbon.

Other objects will be in part apparent and in part pointed out hereinafter.

In the drawings:

Fig. 1 is a vertical sectional elevation taken substantially along the line I—I of Fig. 2 and including a supply tank for molten glass.

Fig. 2 is a plan view of the machine.

Fig. 3 is a sectional plan view taken substantially along the line III—III of Fig. 4.

Fig. 4 is a side elevation of the complete machine.

Fig. 5 is a detail sectional view showing the manner in which the stoppers are ejected from the molds.

Fig. 6 is a fragmentary detail view showing the means for removing excess glass from the upper ends of the stoppers and the mold plate.

In the illustrated embodiment of my invention the mold carriage 10 is rotatably mounted on a stationary central column 11 rising from a wheeled base 12 the latter providing means whereby the entire machine may be moved into and out of operative position with respect to a tank 13 or furnace, containing a supply body of molten glass 14. The mold carriage 10 is continuously rotated by a motor 18 operating through mechanism including a bevel gear 15 secured to the lower end of the mold carriage and running in mesh with a driving pinion 16 secured to the upper end of a shaft 17. A pair of meshing bevel gears 19, one of which is suitably secured to the lower end of the shaft 17, provides driving connection between the motor and said shaft.

The stopper molds comprise a neck mold plate 20 provided near its periphery with an annular series of vertical openings 21 or neck mold cavities. The walls of these cavities or openings may be of any preferred shape. Head mold groups 22 are arranged in an annular series beneath the neck mold cavities and cooperate with the latter in forming glass stoppers. Each group includes a plate 23 having a series of recesses 24 or head mold cavities, in its upper side adapted to register with the neck mold cavities 21. These head molds are adapted to be moved vertically into and out of position to cooperate with the neck mold cavities. Such movement is obtained by mounting each head mold plate 23 on a pair of guide rods 25 depending from the neck mold plate 20, said rods extending through guide openings 26 in said head mold plates. A roller 27 is carried by each head mold plate 23 and runs in a continuous circular track 28 or cam encircling the lower portion of the mold carriage and suitably supported on the base 12. This track 28 is so shaped that at regular time intervals it imparts vertical movement to the head mold plates whereby the latter at times snugly contact with the lower side of the neck mold plate 20 for cooperation with the neck mold cavities and at other times are spaced downwardly from said neck mold plate to permit the discharge of the finished stoppers S into a discharge chute C. Each head mold plate 23 is formed with an upstanding flange 23ª at its outer edge, adapted to take over a portion of the periphery of the neck mold plate 20 and with the latter and a vertical flange 29 thereon, provide a channel 30 into the bottom of which the neck mold cavities 21 open. In this manner a trough or channel is provided in proximity to the mold charging station and for a considerable distance beyond said station, into which trough a continuous stream or ribbon of molten glass may flow for the purpose of filling the neck and head mold cavities.

After the molds pass the charging station (Fig. 1) and the molten glass has filled the cavities it is necessary to compact the glass so that the stoppers will be accurately formed and of uniform weight. For this purpose, presser bars 31 or press plungers, individual to the head mold groups 22 are mounted above the neck mold plate 20 and adapted to move vertically into and out of the channel 30 at regular time intervals. Each presser bar is of arcuate formation and suitably secured to a carrier 32 mounted on a pair of upstanding guide rods 33 suitably anchored in the neck mold plate 20. Coil springs 34 encircling the guide rods 33 yieldingly hold the carriers 32 in their upermost positions so that the presser bars do not interfere with the stream flow of glass into the channel 30 and mold cavities. Downward movement of the carriers 32 to operatively position the presser bars 31 is obtained by means including a continuous stationary cam 35 suitably connected to the upper end of the stationary column 11 and encircling the latter, said cam being in constant engagement with cam rolls 36 on the carriers 32 and at times moving the latter downwardly against the upward pressure of the springs 34. Just before the molds reach the station "A" (Fig. 2) the head mold groups are lowered, thereby moving the flanges 23ª (Fig. 1) on the head mold plates to a plane below the neck molds so that when the molds reach said station "A" the excess glass on the upper side of the neck mold plate may be removed therefrom by means of a knife 37 or scraper. This knife may be carried by a bracket 38 suitably secured to the base 20, said knife being in such position that it causes excess glass removed from the neck mold plate to drop into a chute 39 for delivery to any suitable receptacle (not shown).

At the discharge station "B" an ejector 40 pushes the finished stoppers out of the neck mold cavities 21 into an inclined chute "C" leading to a leer (not shown). This ejector 40 may comprise a wheel 41 provided with a series of fingers 42 on its periphery, said fingers being spaced to enter the neck mold cavities and remove the stoppers from the latter as stated above. The wheel is mounted on a shaft 43 carried by a bracket 44 rising from the base 12. A driving wheel 45 secured to the inner end of the shaft 43 has frictional driving contact with the upper surface of the continuous flange 29 on the neck mold plate 20 so that rotation of the latter imparts rotary movement to the wheel in timed relation to movement of the molds past the discharge station "B".

In operation, molten glass is delivered through the spout 13ª or trough, and flows in a constant stream into the channel 30 and thence into the neck mold and head cavities. As the mold carriage rotates the presser bars 31 are moved downwardly by the cam 35 into the channel 30 so that the glass in the molds is completely compacted in the mold cavities, thereby insuring proper shaping and formation of the stoppers. The molds then reach a point at which the head mold groups are lowered (Fig. 4) and a scraper or knife removes the excess glass as stated above. Next, the neck molds supporting the finished stoppers arrive at the discharge station "B" where the ejector 40 forces the finished stoppers from the neck mold cavities into the chute "C".

Modifications may be resorted to within the spirit and scope of the appended claims.

What I claim is:

1. In a glassware forming machine, the combination of an annular series of neck molds, an annular series of groups of head molds arranged beneath and at all times in register with the neck molds, an annular series of presser bars above and individual to groups of head molds adapted to compact molten glass in said molds, means continuously rotating the neck and head molds and presser bars, about a common vertical axis, means for moving the head mold groups vertically into and out of position to cooperate with the neck molds, and means for ejecting the finished articles at a discharge station.

2. In a machine for forming glass stoppers, an annular series of neck molds, an annular series of head molds beneath and at all times in register with the neck molds, means for moving the head molds into and out of position to cooperate with the neck molds in forming stoppers, means for continuously rotating said molds about a vertical axis within the path defined by the series of molds, means providing a continuous stream flow of molten glass into the cooperating molds at a charging station, means for compacting the glass in said molds, means for removing excess glass from the upper side of the neck molds, means for causing relative vertical movement between the head and neck molds in advance of a discharge station leaving stoppers attached to the neck molds, and mechanical means including a rotating series of fingers adapted to project into the neck molds and eject finished articles from said molds at the discharge station.

3. In a machine for forming glass stoppers, a ring-like neck mold plate having an annular series of neck mold cavities therein, an annular series of groups of head molds arranged beneath the plate for periodic cooperation with the neck mold cavities, means for moving the head mold groups vertically into and out of position to cooperate with the neck mold cavities, an annular series of presser bars arranged above the neck mold cavities and operable periodically to compact molten glass in the head and neck molds, means for continuously rotating said molds and presser bars about a common vertical axis within the path defined by the series of molds, means providing for continuous stream flow of molten glass to the neck and head molds at a charging station, means for removing excess glass from the neck mold plate, means for causing relative vertical movement between the neck and head molds in advance of the discharge station, and means including a continuously rotating circular series of fingers adapted to eject finished articles from the neck mold cavities at the discharge station.

4. A glass stopper forming machine comprising a rotary mold carriage movable about a vertical axis, means for continuously rotating the carriage, an annular series of single piece neck molds on the carriage, an annular series of head molds mounted upon said carriage for cooperation with the lower ends of the neck molds in forming stopper shaping cavities, means for delivering molten glass in a continuous stream to said molds, pressers rotating with the carriage for compacting the glass in said cavities, and means for removing the formed articles from the molds.

5. A glassware forming machine comprising an annular series of single piece neck molds, an annular series of head mold groups arranged below and at all times in register with the neck molds, means for continuously rotating all of said molds about a common vertical axis, means for moving said groups of head molds vertically into and out of position to cooperate with the neck molds in forming articles, means for delivering molten glass to the molds while the head molds are in position to cooperate with the neck molds, means for compacting the glass in said molds, and means including a series of fingers movable into the neck molds for ejecting finished articles from said molds.

6. In a glass stopper forming machine the combination of a rotary mold carriage, means for continuously rotating said carriage, a ring-like neck mold plate extending about the axis of and carried by said carriage, said plate having an annular series of vertical neck mold cavities, head molds individual to the neck mold cavities arranged to cooperate therewith in forming articles, pressers for compacting material in said cavities to thereby completely fill them and form the stoppers, means for causing relative vertical movement between the head and neck molds, and means for then ejecting the finished stoppers.

7. In a glassware forming machine the combination of a rotary mold carriage, means for rotating the carriage continuously, a circular neck mold plate extending about and carried by said carriage, said plate having an annular series of neck mold cavities extending vertically therethrough, an upstanding continuous flange spaced inwardly from and in proximity to the neck mold cavities, an annular series of groups of head molds arranged beneath the neck mold plate and mounted on the mold carriage, means for moving the head mold groups vertically at regular time intervals bringing the head molds into position to cooperate with the neck mold cavities, each head mold group including a plate having an upstanding flange adapted at times to cooperate with the neck mold plate and flange thereon in forming a channel into which molten glass is adapted to flow for delivery to the mold cavities, means for causing a stream flow of molten glass into the channel, means for compressing molten glass in the head and neck molds, means for removing excess glass from the upper side of the neck mold plate and means for ejecting finished articles at a discharge station.

8. In a glass stopper forming machine, the combination of an annular series of neck molds, groups of head molds arranged beneath and at all times in register with the neck molds, means for continuously moving all of said molds about a common vertical axis, said head molds mounted for up and down movement into and out of position to cooperate with the neck molds in forming stopper shaping cavities, automatic means for moving the head molds up and down, pressers for compacting glass in the cavities and filling them to completely form stopper therein, a continuously rotating article ejecting device including fingers movable into the neck molds, and means whereby movement of the molds rotates said device.

9. In a machine for forming glass stoppers, the combination of a carriage rotatable about a vertical axis, said carriage including an annular trough, means for causing a continuous stream flow of glass into the trough, said trough being formed with mold openings extending vertically therethrough, molds on the carriage beneath and at all times in register with said openings, means for bringing the molds and openings together to form stopper cavities, and pressers for causing glass to pass from the trough into and fill said cavities.

10. In a machine for forming glass stoppers, the combination of a carriage rotatable about a vertical axis, said carriage including an annular trough, means for causing a continuous stream flow of glass into the trough, said trough being formed with openings extending vertically therethrough, molds on the carriage beneath and at all times in register with said openings, means for bringing the molds and openings together to form stopper shaping cavities, a press plunger mounted above the trough and rotatable with the carriage, and means for operating said plunger and causing it to press the glass into said cavities and thereby form stoppers.

Signed at Toledo, Ohio, this 17th day of July, 1930.

FLOYD FLEXON.